United States Patent
Gavin et al.

(10) Patent No.: US 8,087,265 B2
(45) Date of Patent: Jan. 3, 2012

(54) FIBERIZING SPINNER INCLUDING A RADIATION SHIELD FOR THE MANUFACTURE OF HIGH QUALITY FIBERS

(75) Inventors: Patrick M. Gavin, Newark, OH (US); Michael T. Pellegrin, Newark, OH (US); James S. Belt, Utica, OH (US); Carmen A. LaTorre, Westerville, OH (US); Marc Alan Lucas, East Point, GA (US)

(73) Assignee: Owens Corning Intellectual Captial, LLC, Toledo, OH (US)

( * ) Notice: Subject to any disclaimer, the term of this patent is extended or adjusted under 35 U.S.C. 154(b) by 0 days.

(21) Appl. No.: 11/647,083

(22) Filed: Dec. 28, 2006

(65) Prior Publication Data

US 2008/0156042 A1 Jul. 3, 2008

(51) Int. Cl.
*C03B 37/04* (2006.01)
(52) U.S. Cl. .......................................................... 65/521
(58) Field of Classification Search .................... 65/481, 65/483–540; 425/72.2; 79/952
See application file for complete search history.

(56) References Cited

U.S. PATENT DOCUMENTS

| | | | |
|---|---|---|---|
| 3,585,268 A * | 6/1971 | Monks et al. ................... | 373/27 |
| 3,644,108 A * | 2/1972 | Russell ........................... | 65/470 |
| 3,928,009 A | 12/1975 | Perry | |
| 4,046,539 A * | 9/1977 | Pitt ................................. | 65/458 |
| 4,534,779 A | 8/1985 | Herschler | |
| 4,544,393 A | 10/1985 | Bilen | |
| 4,545,796 A * | 10/1985 | Crosby .......................... | 65/521 |
| 4,689,061 A * | 8/1987 | Britts ............................. | 65/460 |
| 4,767,431 A * | 8/1988 | Lewis et al. .................... | 65/460 |
| 4,917,715 A * | 4/1990 | Kaveh et al. ................... | 65/443 |
| 5,509,953 A * | 4/1996 | Gavin ............................ | 65/502 |
| 5,582,841 A | 12/1996 | Watton et al. | |
| 5,779,760 A | 7/1998 | Watton et al. | |
| 5,785,996 A | 7/1998 | Snyder | |
| 6,167,729 B1 * | 1/2001 | Watton et al. .................. | 65/497 |
| 6,990,837 B2 * | 1/2006 | Skarzenski et al. ............ | 65/521 |
| 7,003,987 B2 | 2/2006 | Skarzenski et al. | |
| 2003/0188557 A1 * | 10/2003 | Skarzenski et al. ............ | 65/521 |
| 2007/0000286 A1 | 1/2007 | Gavin et al. | |

FOREIGN PATENT DOCUMENTS

EP 1645547 4/2006
WO WO 01/11118 2/2001

OTHER PUBLICATIONS

HASTELLOY® X brochure as provided by Haynes International, Inc.*
International Search Report dated May 29, 2008 in PCT/US2007/026302.

* cited by examiner

*Primary Examiner* — Jason L Lazorcik
*Assistant Examiner* — Jodi C Cohen
(74) *Attorney, Agent, or Firm* — MacMillan, Sobanski & Todd, LLC

(57) ABSTRACT

An apparatus for manufacturing high quality glass wool fibers, and more particularly to a spinner including a radiation shield is disclosed. The spinner includes a number of radiation shield positioned beneath the spinner base and decreases the temperature gradient along the peripheral sidewall of the spinner and improves the quality of the glass fibers. One suitable material for the radiation shield is a high temperature nickel alloy.

19 Claims, 5 Drawing Sheets

FIBERIZING SPINNER INCLUDING A RADIATION SHIELD FOR THE MANUFACTURE OF HIGH QUALITY FIBERS

TECHNICAL FIELD AND INDUSTRIAL APPLICABILITY OF THE INVENTION

The present invention relates to a fiberizer and spinner for use in the manufacture of high quality glass wool fibers, and more particularly to an improved radiation shield for insulating spinners used in the rotary fiberizing process.

BACKGROUND OF THE INVENTION

Fibers of glass and other thermoplastic materials are useful in a variety of applications including acoustical and thermal insulation materials. Common prior art methods for producing fiberglass insulation products involve producing glass fibers from a rotary process. In a rotary process, glass composition is melted and forced through orifices in the outer peripheral wall of a centrifuge, commonly known as a centrifugal spinner, to produce the fibers. One commonly used spinner is generally cup-shaped that has a base wall with a central hole, a top opening and an outer peripheral sidewall that curves upward from the base wall, forming the top opening. Another commonly used spinner uses a slinger cup to propel the glass composition to the sidewall for fiberization. A drive shaft is used to rotate the spinner and is typically fixed to the spinner with a quill.

During fiberization, the spinner is subjected to high temperatures and high rotational speeds that exert substantial force on the spinner. An external burner forces a jet of hot gas onto the fibers as they are extruded through the orifices of the sidewall to heat the fibers, and an external blower is used to stretch the fibers. During fiberization, it is important to maintain the glass at a predetermined temperature to improve the quality of fiberization. While the preferred temperature varies based on equipment and manufacture, it is typically the temperature at which the molten glass has a viscosity of 1000 poise (also referred to as the log 3 viscosity).

Spinners are formed of metal alloys and typically include a base wall and a foraminous sidewall. The molten glass is dropped onto the base surface of the spinner and is propelled against the sidewall by the rotation of the spinner. The base surface of the spinner radiates and converts heat from the molten glass and spinner sidewall. The orifices at the lower edge of the sidewall cool to a temperature lower than that of the higher orifices. The cooling of the orifices cools the glass and increases viscosity of the glass and leads to thicker stiffer primary fibers. Allowing the glass to cool may allow for devitrification of the glass, which may lead to plugging of the lower orifices.

Thus, there exists a need in the art for a spinner that maintains the spinner base and peripheral sidewall as well as the molten glass, while in the spinner prior to fiberizing, at a preferred temperature and that confers improved properties to the fiberglass insulation product.

SUMMARY OF THE INVENTION

The need to control glass temperature in the spinner and improve glasswool quality is met by a spinner according to the present invention. The spinner of the present invention is adapted to control the temperature of the molten glass by including a radiation shield mounted beneath the spinner. The radiation shield is positioned beneath the spinner and typically includes a multi-layer structure. The objectives, features, and advantages of the present invention will become apparent upon consideration of the description herein and the appended claims and drawings.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Although the present invention is herein described in terms of specific embodiments, it will be readily apparent to those skilled in this art that various modifications, rearrangements, and substitutions can be made without departing from the spirit or scope of the invention. The scope of the present invention is thus only limited by the claims appended hereto.

Figure 1:
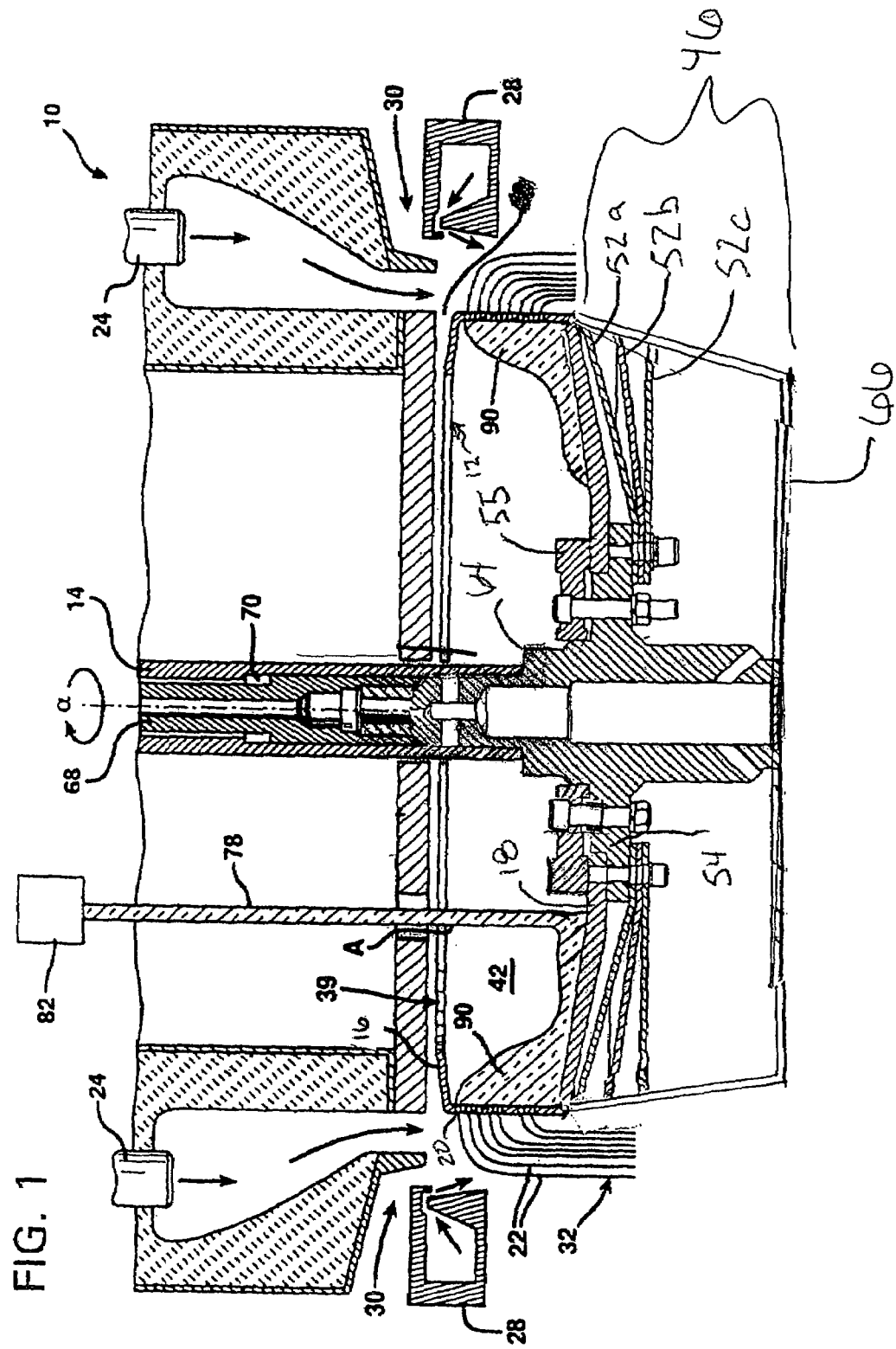
FIG. 1 is a partially schematic cross-sectional view in elevation of a fiberizer with a radiation shield according to the principles of the present invention.

Referring to FIG. 1, the fiberizer 10 includes a spinner 12 fixed to a hub 54 of quill 64 at the lower end of a rotatable shaft or spindle 14. Rotating the spinner 12 by rotating spindle 14 is known in the art. The spinner 12 includes a base 16 extending from hub 54 to the peripheral wall 18. Disposed around the outer periphery of the peripheral wall 18 is a plurality of orifices 20 for centrifuging fibers 22 of a molten thermoplastic material, for example, glass.

The spinner 12 is supplied with a stream 78 of a molten thermoplastic material. Conventional supply equipment 82 can be used to supply stream 78 of molten glass. Such molten glass supply equipment is well known in the industry and, therefore, will not be discussed in detail herein. The glass in stream 78 drops into the chamber 42 of spinner 12 and through centripetal force is directed against the peripheral wall 18 and flows outwardly to form a build-up or head 90 of glass. The glass then flows through the orifices 20 to form primary fibers 22, which are heated and stretched by burners 24 and annular blower 28.

The rotation of the spinner 12 (as depicted by the circular arrow (a) in FIG. 1) centrifuges molten glass through orifices 20 in spinner peripheral wall 18 to form primary fibers 22. The primary fibers 22 are maintained in a soft, attainable condition by the heat of an annular burner 24. The annular blower 28 uses induced air through passage 30 to pull primary fibers 22 and further attenuate them into secondary fibers 32 suitable for use in a product, such as wool insulating materials. The secondary fibers 32 are then collected on a conveyor (not shown) for formation into a product, such as a glass wool pack.

A hollow quill 64 is press fit in a borehole formed through the center of hub 54 and locked in place with three circumferentially spaced locking pins 66. The upper end of the quill 64 is threaded into the lower end of a hollow drawbar 68. The quill 64 is preferably cooled further with water circulated through an annular cooling jacket 70 disposed around spindle 14 and quill 64 and above hub 54. The quill 64 and hub 54 are preferably fabricated from a low thermal expansion alloy to minimize differential thermal expansion between them.

The radiation shield may include a number of individual plates 52a, 52b, 52c. The plates may be connected to the hub 54 of quill 64. The plates inhibit convection from the base of the spinner and inhibit the infrared energy from escaping from the base of spinner 12 and decreases the thermal gradient along the height of the peripheral sidewall 18 thus inhibit devitrification within the glass head 90 and controls the temperature of the glass as it passes through the orifices 20 at the lower edge of peripheral sidewall 18. The uppermost shield 52a is preferably frustoconical to follow the base wall 16 of spinner 12. The lower shields 52b, 52c may be frustoconical or planar to allow space between the shields. The shields 52 may be formed of stainless steel or a refractory metal, such as HASTELLOY alloy a transition metal nickel based high temperature alloy. On especially suitable material for the shields is HASTELLOY X alloy, which is available from Haines International of Kokomo, Ind., USA. HASTELLOY X alloy includes 47 weight % Ni, 22 weight % Cr, 18 weight % Fe, 9 weight % Mo, 1.5 weight % W, 0.1 weight % C, 1 weight % Mn (maximum), 1 weight % Si (maximum) and 0.008 weight % B (maximum).

Figure 2:
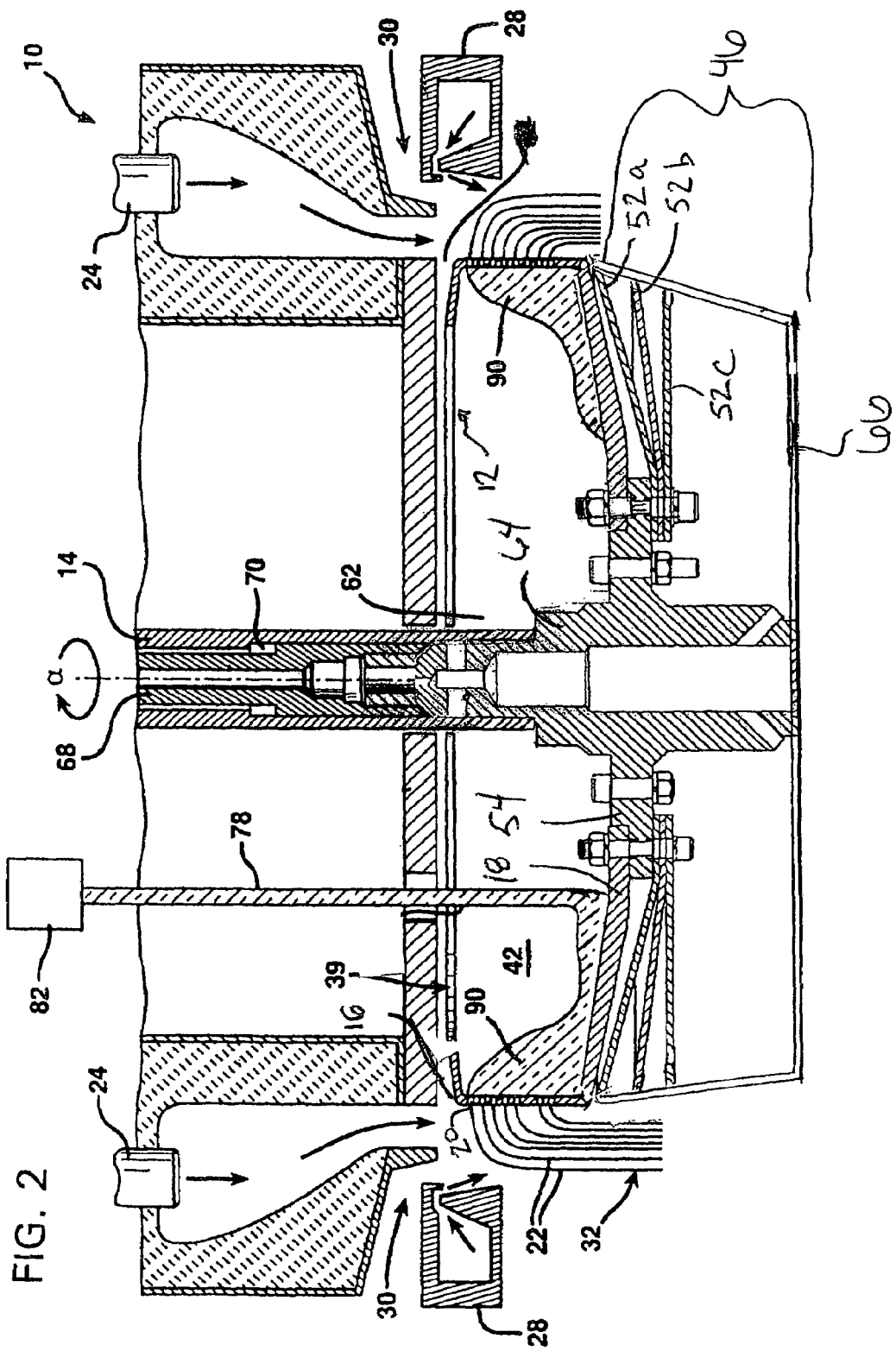
FIG. 2 is a partially schematic cross-sectional view in elevation of a fiberizer with a radiation shield according to the principles of the present invention.
Figure 3:
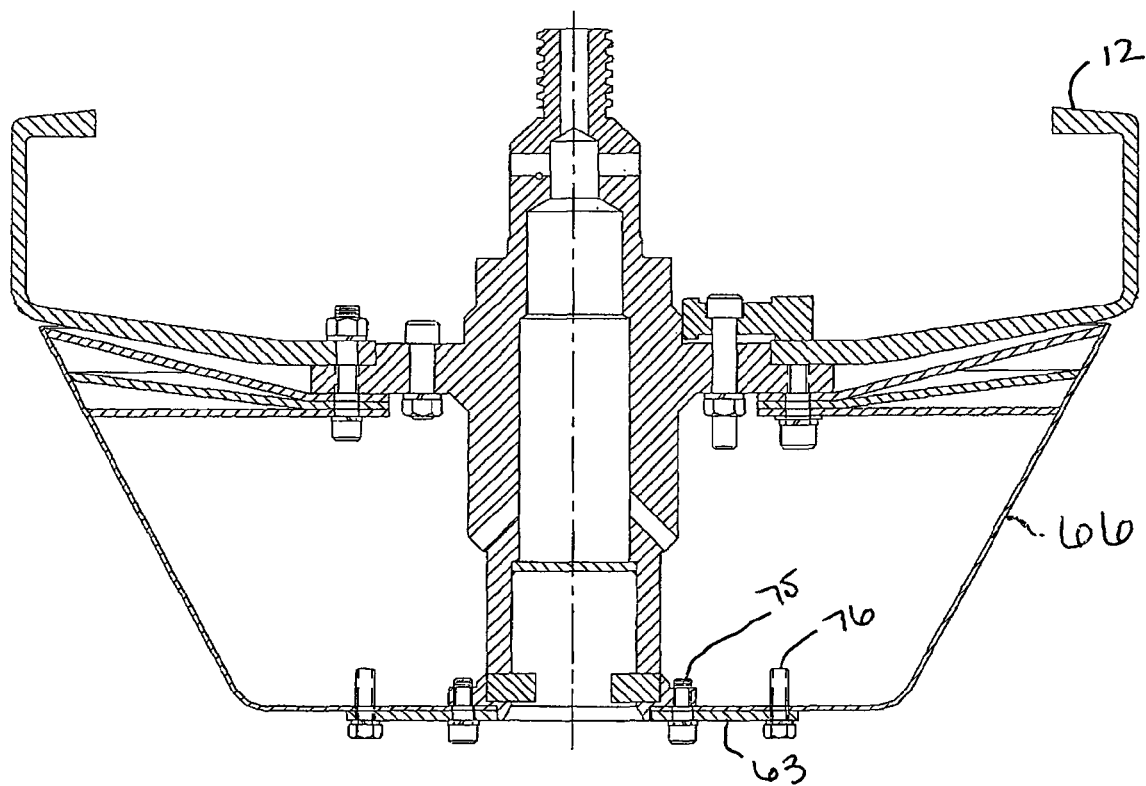
FIG. 3 is a partially schematic cross-sectional view in elevation of a fiberizer with a radiation shield according to the principles of the present invention

Similarly, the fiberizer 10 of FIG. 2 includes a spinner 12 clamped to the hub 54 on quill 64 that is mounted at the lower end of spindle 14 by clamping ring 55. The spinner 12 includes a base 16 extending to the peripheral wall 18, which contains a plurality of orifices 20 for centrifuging fibers 22. A stream 78 of a molten thermoplastic is supplied to the chamber 42 material spinner 12 by conventional supply equipment 82. The molten thermoplastic flows outwardly to form a build-up or head 90 of glass. The glass then flows through the orifices 20 to form primary fibers 22, which are heated and stretched by burners 24 and annular blower 28. The annular blower 28 uses induced air through passage 30 to pull primary fibers 22 and further attenuate them into secondary fibers 32. The circular arrow ($\alpha$) shows the rotation of the spinner 12.

Spinners are manufactured in a variety of geometries depending upon the fiberization process used. Typically, major manufacturers of glass fiber have their own fiberization process, which varies from manufacturer to manufacturer; however, the principles of the present invention are equally suitable for use in any rotary fiberization process.

Figure 4:
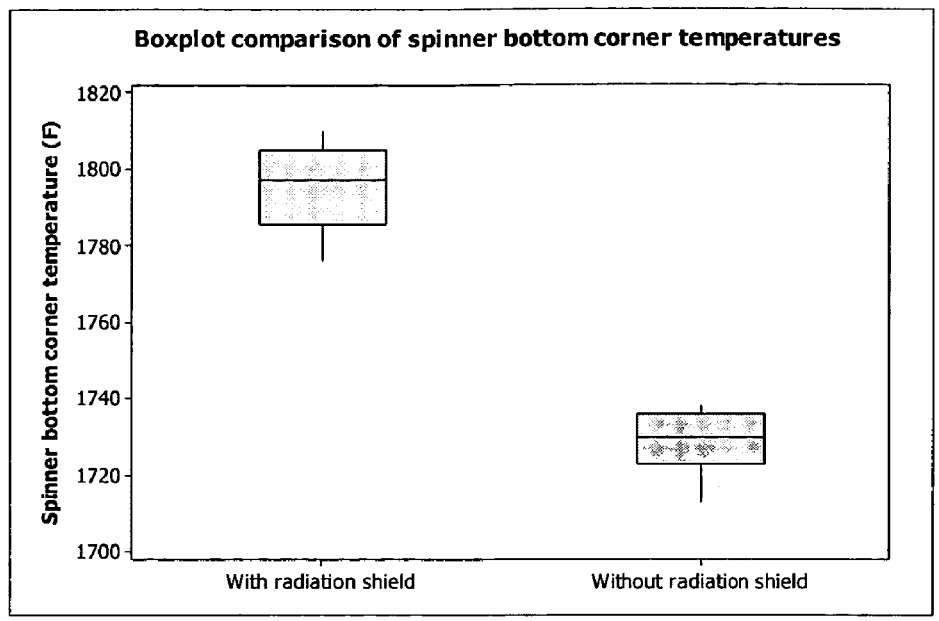
FIG. 4 is a box plot graph comparing the temperatures of the bottom corner of a spinner including a radiation shield of the present invention and bottom corner of a spinner without a radiation shield.

FIG. 4 shows a box plot graph comparing the temperatures of the bottom corner of a spinner including a radiation shield of the present invention and the bottom corner of a spinner without a radiation shield. As shown in the graph, the radiation shield insulator significantly increased the average temperature around the spinner bottom corner (+70 F).

Figure 5:
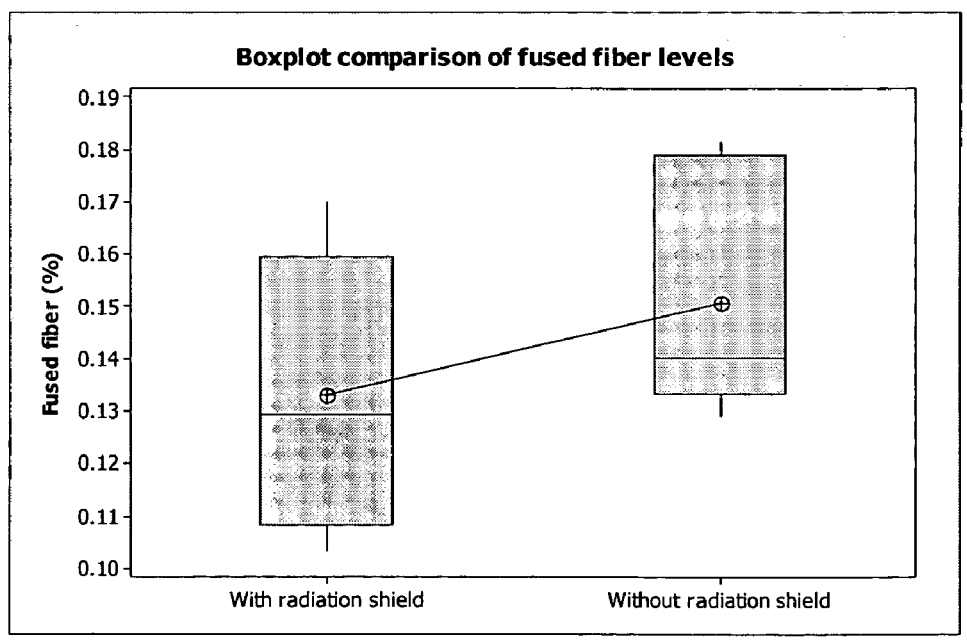
FIG. 5 is a box plot graph comparing the percentage of fused fibers generated from a spinner including a radiation shield of the present invention and a spinner without a radiation shield.

FIG. 5 is a box plot graph comparing the percentage of fused fibers generated from a spinner including a radiation shield of the present invention and a spinner without a radiation shield.

Figure 6:
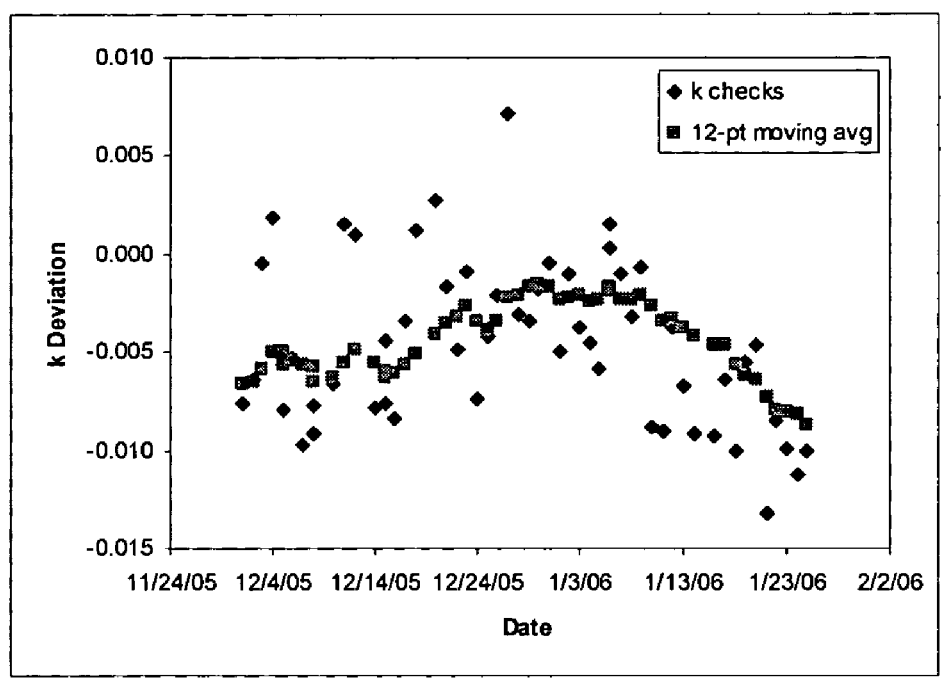
FIG. 6 is a graph of thermal data from spinners including the radiation shield of the present invention and spinners without radiation shields.

FIG. 6 is a graph of showing K-values for spinners without the radiation shield of the present invention (prior to Jan. 6, 2006) and the K-values for spinners including the radiation shield (Jan. 6, 2006 and thereafter). K-value is a measure of heat conductivity. Specifically, it is the measure of the amount of heat, in BTUs per hour, that will be transmitted through one square foot of material that is one inch thick to cause a temperature change of one degree Fahrenheit from one side of the material to the other. The lower the K-value for a material, the better it insulates.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

We claim:
1. A fiberizing spinner comprising:
a spinner having a base for receiving molten glass, said base being mounted on a rotatable hub affixed for rotation with a quill;
a primary radiation shield plate mounted below said spinner having a first end and a second end, the first end of the primary radiation shield plate being mounted on said rotatable hub, the primary radiation shield plate is spaced apart from said base to inhibit convection from said base;
at least one secondary radiation shield plate having a first end and a second end, the first end of the secondary radiation shield plate being mounted on said rotatable hub, said secondary radiation shield plate being mounted beneath said primary radiation shield plate and having a portion thereof spaced apart from said primary radiation shield plate; and
a quill pan connected to said quill, the quill pan having a base and a peripheral side, said base mounted below at least one secondary radiation shield;
wherein a second end of said primary radiation shield plate and a second end of said secondary radiation shield plate are connected to the peripheral side of the quill pan.

2. The fiberizing spinner of claim 1, wherein said primary radiation shield plate is formed of stainless steel.

3. The fiberizing spinner of claim 1, wherein said primary radiation shield plate is formed of a nickel based alloy.

4. The fiberizing spinner of claim 1, wherein said primary radiation shield plate is formed of a nickel based alloy comprising approximately 47 weight % Ni, 22 weight % Cr, 18 weight % Fe, 9 weight % Mo, 1.5 weight % W, 0.1 weight % C, 1 weight % Mn, 1 weight % Si and 0.008 weight % B.

5. The fiberizing spinner of claim 1, wherein said primary radiation shield plate is formed of a nickel based alloy comprising approximately 47 weight % Ni, 22 weight % Cr, 18 weight % Fe, 9 weight % Mo.

6. The fiberizing spinner of claim 1, further comprising a further secondary radiation shield plate mounted below said primary radiation shield plate, each said secondary radiation shield plate having a portion thereof spaced from the adjacent radiation shield plate.

7. A shielded spinner apparatus for the manufacture of glass fiber insulation comprising:
a rotatable quill having a hub located axially above a terminal end of said rotatable quill; at least one spinner mounted to said rotatable quill, said spinner having a spinner base configured to receive molten glass;
a primary radiation shield having a first end mounted on said hub and having at least a portion thereof spaced below said spinner base to inhibit convection from said base;

a secondary radiation shield having a first end mounted on said hub below said primary radiation shield and having at least a portion thereof being spaced below said primary radiation shield; and a quill pan mounted on said terminal end of said rotatable hub beneath said primary radiation shield and below said secondary radiation shield, wherein said quill pan and said spinner base enclose said primary and secondary radiation shields and wherein a second end of said primary radiation shield plate and a second end of said secondary radiation shield plate are connected to the quill pan.

8. The shielded spinner apparatus of claim 7, wherein said primary radiation shield is formed of stainless steel.

9. The shielded spinner apparatus of claim 7, wherein said primary radiation shield is formed of a nickel based alloy.

10. The shielded spinner apparatus of claim 7, wherein said primary radiation shield is formed of a nickel based alloy comprising approximately 47 weight % Ni, 22 weight % Cr, 18 weight % Fe, 9 weight % Mo, 1.5 weight % W, 0.1 weight % C, 1 weight % Mn, 1 weight % Si and 0.008 weight % B.

11. The shielded spinner apparatus of claim 7, wherein said primary radiation shield is formed of a nickel based alloy comprising approximately 47 weight % Ni, 22 weight % Cr, 18 weight % Fe, 9 weight % Mo.

12. The shielded spinner apparatus of claim 7, further comprising an additional second secondary radiation shield mounted on said hub below said secondary radiation shield and having at least a portion thereof spaced from said secondary radiation shield.

13. A fiberizer for the manufacture of glasswool comprising:

a rotatable quill having an axis of rotation and being formed with a hub extending radially outwardly from said axis of rotation, said hub being located axially above a terminal end of said quill;

a spinner mounted to said hub of said quill, said spinner having a spinner base wall and a foraminous peripheral sidewall;

a multilayer radiation shield beneath the spinner base wall of said spinner, each layer of said radiation shield having a portion thereof spaced apart from the adjacent layer and a first end affixed to said hub of said quill; and a quill pan mounted on said terminal end of said quill so as to be located beneath and spaced from said multilayer radiation shield and wherein a second end of each layer of said radiation shield is connected to the quill pan.

14. The fiberizer of claim 13, wherein the multilayer radiation shield includes a frustoconical primary radiation shield layer proximate to the base wall of said spinner.

15. The fiberizer of claim 14, wherein the primary radiation shield layer is formed of a high temperature nickel alloy.

16. The fiberizer of claim 13, wherein the multilayer radiation shield includes at least one secondary radiation shield layer distal to the base wall of said spinner.

17. The fiberizer of claim 13, wherein the multilayer radiation shield includes two secondary radiation shield layers distal to the base wall of said spinner, said quill pan enclosing said multilayer radiation shield.

18. The fiberizer of claim 14, wherein said primary radiation shield layer is a plate formed of a high temperature nickel alloy comprising approximately 47 weight % Ni, 22 weight % Cr, 18 weight % Fe, 9 weight % Mo, 1.5 weight % W, 0.1 weight % C, 1 weight % Mn, 1 weight % Si and 0.008 weight % B.

19. The fiberizer of claim 14, wherein said primary radiation shield layer is a plate formed of a high temperature nickel alloy comprising approximately 47 weight % Ni, 22 weight % Cr, 18 weight % Fe, 9 weight % Mo.

\* \* \* \* \*